United States Patent [19]

McCuen

[11] Patent Number: 4,935,682

[45] Date of Patent: Jun. 19, 1990

[54] FULL AUTHORITY ENGINE-OUT CONTROL AUGMENTATION SUBSYSTEM

[75] Inventor: Michael S. McCuen, Kirkland, Wash.

[73] Assignee: The Boeing Company, Seattle, Wash.

[21] Appl. No.: 231,208

[22] Filed: Aug. 11, 1988

[51] Int. Cl.$^5$ ............... B64C 13/16; G05D 1/10
[52] U.S. Cl. ........................... 318/586; 318/584; 244/76 J
[58] Field of Search ............ 318/584, 586; 60/228, 60/229; 244/12.3, 12.4, 23 D, 51, 52, 56, 76 J, 87, 172

[56] References Cited

U.S. PATENT DOCUMENTS

| | | | |
|---|---|---|---|
| 2,597,020 | 5/1952 | Nissen | 244/76 |
| 3,068,647 | 12/1962 | Santamaria et al. | 244/76 J |
| 3,175,787 | 3/1965 | Boue et al. | 244/76 |
| 3,275,268 | 9/1966 | Auld, Jr. | 244/77 |
| 3,301,510 | 1/1967 | Cook | 318/586 X |
| 3,750,985 | 8/1973 | Wheldon | 244/83 |
| 3,777,242 | 12/1973 | Tribuno et al. | 318/586 |
| 3,837,603 | 9/1974 | Schulz et al. | 244/77 A |
| 4,094,479 | 6/1978 | Kennedy | 318/586 X |
| 4,492,907 | 1/1985 | Fabian et al. | 318/586 |
| 4,648,569 | 3/1987 | Stewart | 244/76 R |

OTHER PUBLICATIONS

AIAA'87, 7J7, *Manual Flight Control Functions*, Mithra M.K.V. Sankrithi and W. F. Bryant, Aug. 1987.

*Primary Examiner*—Bentsu Ro
*Attorney, Agent, or Firm*—Christensen, O'Connor, Johnson & Kindness

[57] ABSTRACT

A full authority engine-out control augmentation subsystem for use in a flight control system to assist a pilot and/or lateral-directional control subsystem in compensating for the yawing moment produced by the differential engine thrust that occurs when the power produced by an engine located on one side of a multi-engine aircraft is lost (or reduced) with respect to the other engines is disclosed. The engine-out control augmentation subsystem produces a compensating rudder command (27) based on straight-gain (21), lag filter (15) and washout filters (23 and 25) modifications of a differential engine thrust signal (11). The engine-out control augmentation subsystem will function with both conventional mechanical and electronic (fly-by-wire) flight control systems.

20 Claims, 2 Drawing Sheets

FULL AUTHORITY ENGINE-OUT CONTROL AUGMENTATION SUBSYSTEM

TECHNICAL AREA

This invention relates to flight control systems and, more particularly, to flight control subsystems for modifying the rudder control signal produced by a flight control system in a manner that compensates for the yawing moment created by the differential engine thrust that occurs when power from an engine located on one side of a multi-engine aircraft is lost or reduced.

BACKGROUND OF THE INVENTION

Most current generation jet aircraft require that a pilot immediately command a rudder change (and/or an aileron change when in the air) following a sudden loss of thrust from an engine. Failure to respond immediately (within one second in the case of a takeoff roll) can result in a loss of aircraft control.

Some aircraft use a simple, limited authority engine-out control augmentation subsystem to assist a pilot in producing a rudder response command that compensates for the loss of thrust. Unfortunately, most such subsystems are functional only during the takeoff, landing and go-around phases of a flight. For example, the Model A320 aircraft produced by the European Commercial Airplane Manufacturing Consortium, commonly referred to as Airbus, includes a limited authority engine failure yawing moment compensation subsystem. The compensation subsystem is coupled to the rudder via a mechanical yaw damper control mechanism and is only operational during the takeoff, approach, landing and go-around phases of a flight. Although safety is slightly enhanced, such a limited authority engine failure subsystem has the disadvantage that it still requires that a pilot respond quickly to an engine failure.

Recent models of the 707-E6 manufactured by The Boeing Airplane Company, commonly referred to as the AWACS airplane, also have a limited authority outboard engine failure yawing moment compensation subsystem. The subsystem provides no compensation for inboard engine failures. Since the subsystem is operational only at airspeeds below 200 knots, it is primarily operational only during the takeoff, approach, landing and go-around phases of a flight. The subsystem was added to the 707-E6 design partially to compensate for the loss of yaw control resulting from the addition of the AWACS randome to the airplane. As with the A320 system, while a limited authority engine failure enhancement to a flight control system slightly enhances safety, such an enhancement still requires that a pilot respond quickly to an engine failure.

An experimental jet transport aircraft designed by The Boeing Company for the military several years ago, designated the YC-14, contained a subsystem that compensated for the loss of lift due to an engine shutdown. The subsystem commanded a reconfiguration of the flaps when an engine shutdown was detected. It did not assist in controlling the lateral-directional axis of the aircraft during an engine failure.

While several commercial aircraft contain a subsystem that detects an engine failure and displays the failure on the flight deck of the aircraft as a pilot caution or warning, such display subsystems do not directly assist a pilot in controlling the operation of the aircraft.

As will be better understood from the following description, this invention is directed to providing an engine-out control augmentation or enhancement subsystem for a flight control system that immediately and promptly assists the pilot of an aircraft and/or an automatic lateral-directional control subsystem in compensating for the yawing moments produced by differential engine thrust, i.e., produced by the loss of thrust of one or more engines on one side of the aircraft. In addition to increasing safety, the invention allows the size of the tail of an aircraft to be decreased.

SUMMARY OF THE INVENTION

In accordance with this invention, a full authority engine-out control augmentation subsystem suitable for use in a flight control system to assist a pilot and/or lateral-directional control subsystems in compensating for the yawing moment produced by the differential engine thrust created by the loss of power from an engine located on one side of a multi-engine aircraft with respect to the power produced by the other engines is provided. The engine-out control augmentation subsystem produces a rudder command based on the manipulation of a differential engine thrust signal. The engine-out control augmentation system will function with conventional mechanical, as well as electronic (fly-by-wire), In accordance with further aspects of this invention, the differential engine signal is manipulated by straight-line gain enhancing the signal.

In accordance with further aspects of this invention, the differential engine signal is filtered by a lag filter prior to being straight-line gain enhanced.

In accordance with still further aspects of this invention, in addition to being straight-gain enhanced, the lag filtered differential engine thrust signal is also manipulated by a washout filter that creates a temporary overshoot.

In accordance with yet other aspects of this invention, the lag filtered differential engine thrust signal is further manipulated by a washout filter that creates a temporary undershoot subsequent to the overshoot.

In accordance with yet still further aspects of this invention, the straight-line gain enhancement, overcompensation washout filtering and undercompensation washout filtering of the lag filtered differential engine thrust signal occur simultaneously and the results are summed prior to being utilized to modify the rudder position of the aircraft.

In accordance with yet still other aspects of this invention, the signal produced by the engine-out control augmentation subsystem is combined with the manual rudder command signals produced by the pilot, and any other directional control commands, and the result used to form a rudder command that controls the position of the rudder of the aircraft.

As will be readily appreciated from the foregoing description, the invention provides a full authority engine-out control augmentation system suitable for use in a flight control system to assist a pilot and/or a lateral-directional control subsystem in compensating for the yawing moment produced by differential engine thrust. The system is a full authority system because it fully compensates for the loss of thrust from an engine located on one side of an aircraft. The engine can be located alongside the fuselag or on a wing of the aircraft. Whether a wing mounted engine is an inboard engine or outboard engine makes no difference to the operation of a full authority engine-out control augmentation subsystem formed in accordance with the invention. The subsystem is operational regardless of the phase of a flight, i.e., the subsystem is operational during the cruise phase of a flight as well as during the takeoff, landing and go-around phases.

BRIEF DESCRIPTION OF THE DRAWINGS

The foregoing and other features and advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
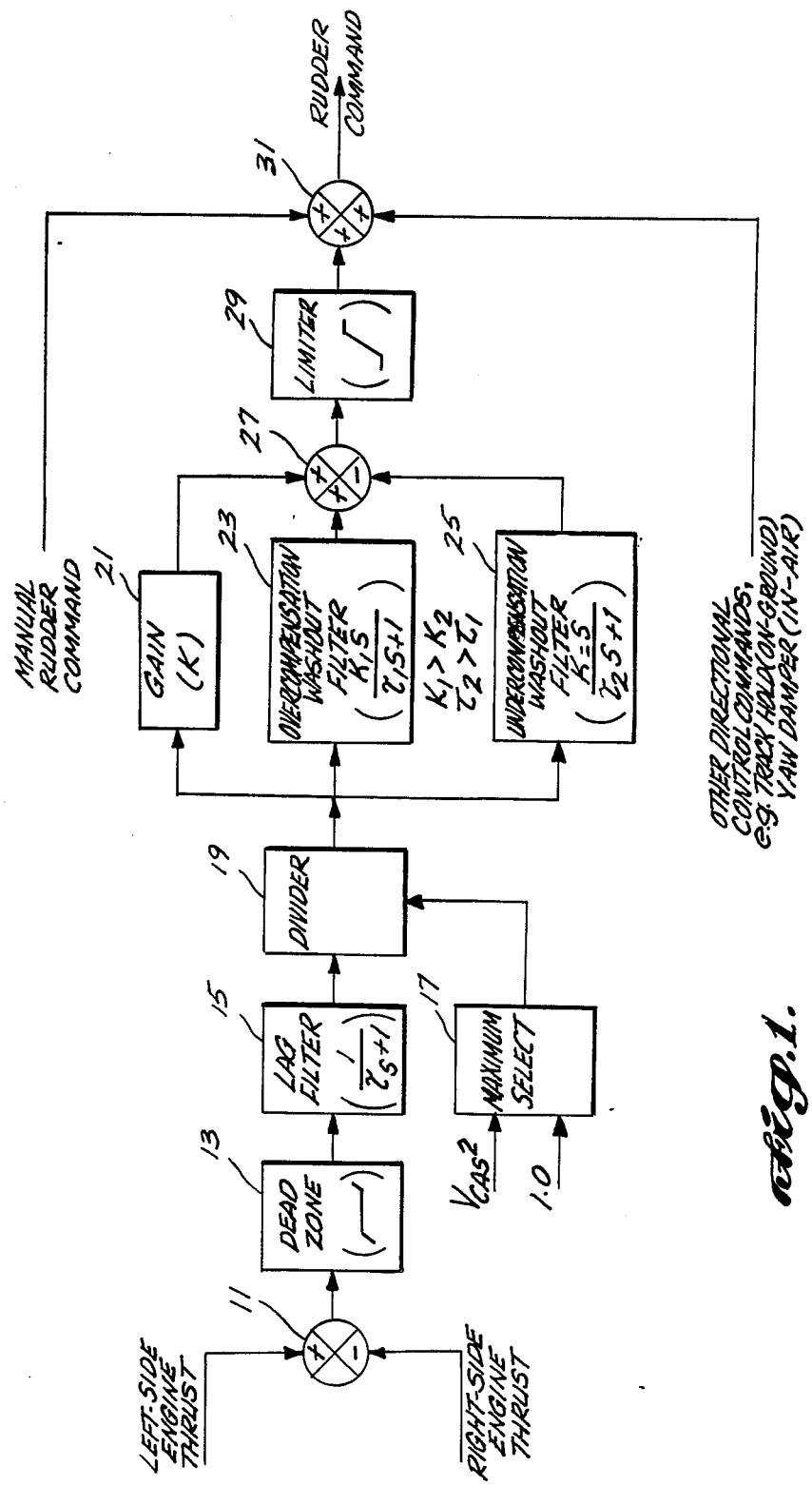
FIG. 1 is a block diagram of a preferred embodiment of the invention.

FIG. 1 is a block diagram of a full authority engine-out control augmentation system formed in accordance with the invention. The system is referred to as a full authority system because it provides a full authority rudder command to compensate for the yawing moment produced by a large thrust differential between the left-side and right-side engines of a multi-engine aircraft such as occurs when the thrust produced by a wing mounted engine is lost due to an engine failure. While the invention was designed for use with jet transport aircraft, the invention could be used with a propeller-driven aircraft. Further, the invention can be utilized with aircraft having two or four wing-mounted engines, or aircraft with engines mounted alongside the fuselage. The invention is usable with conventional mechanical flight control systems as well as electronic (fly-by-wire) flight control systems.

For ease of description, the embodiment of the invention illustrated in FIG. 1 is shown in functional circuit form. The functional circuit blocks can be implemented in integrated circuit form, discrete element form or software form. The illustrated functional blocks include: a two-input summer 11; a dead zone circuit 13; a lag filter 15; a maximum select circuit 17; a divider 19; a gain circuit 21; an overcompensation washout filter 23; an undercompensation washout filter 25; a first three-input summer 27; a limiter 29; and, a second three-input summer 31.

The two-input summer 11 is a subtractive summer that receives thrust signals from the left-side and right-side engines. The thrust signals represent the thrust produced by the related engine. Since the two-input summer is a subtractive summer, the output of the two-input summer 11 is a differential signal whose magnitude denotes the difference in thrust between the left-side and right-side engines.

The output of the two-input summer is applied to the input of the dead zone circuit 13, which prevents small thrust differences from affecting the yaw control. That is, in a conventional manner the dead zone circuit prevents small positive or negative thrust differences from reaching downstream circuits. The output of the dead zone circuit 13 is applied to the input of the lag filter 15, which, mathematically, has the following Laplace transform function:

$$\frac{1}{\tau s + 1} \quad (1)$$

where $\tau$ lies in the range of 0.1 to 1.0. The lag filter 15 is included to prevent differential signals that pass through the dead zone circuit from causing too rapid of a modification of the commands that are ultimately applied to the rudder of the aircraft. In this regard, if the engine-out control modification of rudder commands responds too quickly, the initial yaw response of the aircraft will be away from the failed engine, rather than toward the failed engine. Such an erroneous response provides incorrect failed engine cues to the aircraft's flight crew.

The output of the lag filter 15 is applied to the numerator input of the divider 19. The denominator input of the divider 19 is supplied by the maximum select circuit 17. In this regard, the maximum select circuit 17 has two inputs—a 1.0 input and a $V_{CAS}^2$ input. As will be readily appreciated by those skilled in the aircraft control system art, $V_{CAS}^2$ is the square of computed air speed, which forms an estimate of dynamic pressure against aircraft control surfaces. The maximum select circuit 17 determines which of these signals has the maximum value and applies the result to the denominator input of the divider 19. The maximum select circuit is included for divide by zero protection. Dividing the lag filtered engine thrust differential signal by $V_{CAS}^2$ accounts for rudder effectivenes at varying dynamic pressures.

The output of the divider 19 is applied to: the input of the gain circuit 21; the input of the overcompensation washout filter 23; and, the input of the undercompensation washout filter 25. The gain circuit 21 multiplies the output of the divider 19 by a gain value designated K. Preferably, the value of K lies within the range of 7 to 12.

The overcompensation washout filter 23 has the following Laplace transform function:

$$\frac{K_1 s}{\tau_1 s + 1} \quad (2)$$

The undercompensation washout filter 25 circuit has the following Laplace transform function:

$$\frac{K_2 s}{\tau_2 s + 1} \quad (3)$$

wherein K1 is greater than K2 and $\tau_2$ is greater than $\tau_1$. The following table sets forth exemplary ranges of $K_1$, $K_2$, $\tau_1$ and $\tau_2$ values:

| Term | Range |
| --- | --- |
| $K_1$ | 12–30 |
| $K_2$ | 6–18 |
| $\tau_1$ | 2–4 |
| $\tau_2$ | 5–7 |

The output of the gain circuit 21 is applied to a noninverting input of the first three-input summer 27; the output of the overcompensation washout filter 23 is applied to a second noninverting input of the first three-input summer 27; and, the output of the undercompensation washout filter 25 is applied to an inverting input of the first three-input summer 27. As will be readily appreciated by those skilled in the control circuit art, it is the application of the washout filter outputs to the noninverting and inverting inputs of the first three-input summer 27 that determines that the overcompensation washout filter 23 provides overcompensation and that the undercompensation washout filter 25 provides undercompensation.

The output of the first three-input summer 27 forms an engine-out control augmentation rudder command. The output of the first three-input summer 27 is applied to one input of the second three-input summer 31 via the limiter 29. The limiter 29 prevents the engine-out control augmentation rudder command from exceeding the mechanical limits of the rudder.

A manual rudder command signal produced by the rudder control of the aircraft (e.g., the rudder pedals of the aircraft) is applied to a second input of the second three-input summer 31 and other directional command signals are applied to the third input of the second three-input summer 31. The other directional control commands may include a track-hold signal, produced when an aircraft is on the ground, and a yaw damper signal, produced when an aircraft is flying, for examples. All inputs of the second three-input summer 31 are noninverting inputs. Thus, the second three-input summer 31 sums all of its input signals. The output of the second three-input summer 31 is a rudder command that is applied to, and controls, the rudder of the aircraft.

As will be readily appreciated from the foregoing description, the primary component of the engine-out control augmentation rudder command produced at the output of the first three-input summer 27 is the lag filtered differential signal multiplied by a straight-gain value. The remaining two terms of the engine-out control augmentation rudder command are washed out over time. The resulting signal is modified by the pilot's manual rudder commands, and may be modified by the tracking/heading hold (on-ground) and yaw damper (in-air) rudder commands produced by other systems (not shown).

As will be readily understood by those familiar with aircraft control systems, the gains and time constant values used in an actual embodiment of the invention will depend on the effectiveness of the rudder and the location of the engines of the aircraft with which the invention is to be used. For example, larger gain and time constant values are required if the engines are wing mounted and the rudder effectiveness is low. The numbers included in this application are for a high by-pass, wing mounted turbofan jet engine.

Figure 2:
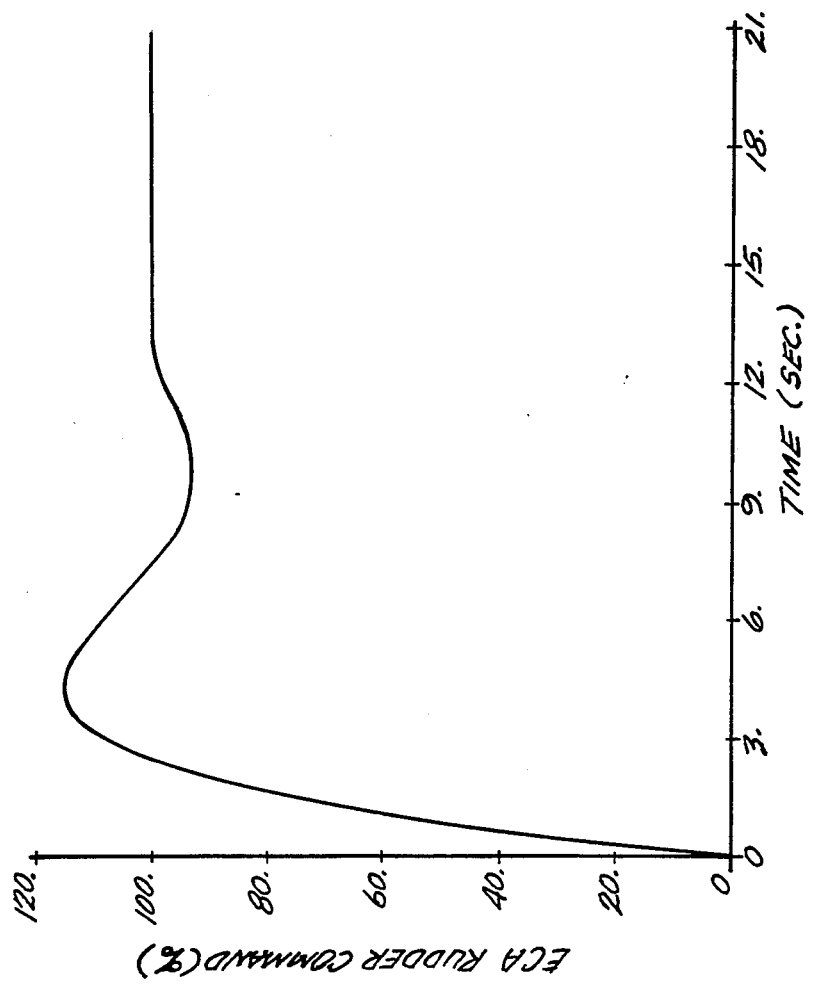
FIG. 2 is a typical rudder command produced by a full authority engine-out control augmentation subsystem formed in accordance with the invention in response to an engine failure assuming a constant air speed.

FIG. 2 illustrates a typical engine-out control augmentation rudder command produced by the embodiment of the invention illustrated in FIG. 1 in response to an engine failure occurring at a constant airspeed. As shown there, after reaching a steady-state condition, the engine-out control augmentation rudder command creates enough yawing moment to compensate for the engine failure yawing moment, i.e., 100% compensation is provided. This portion of the engine-out control augmentation rudder command is produced by the straight-gain term of the control subsystem, i.e., by the gain value, K, of the gain circuit 21. Starting at the left of FIG. 2, the initial response overcompensates for the engine failure yawing moment, forcing the aircraft back toward its original path. This overcompensation is created by the first washout term, i.e., by the signal produced at the output of the overcompensation washout filter 23. The rudder command is then slightly undercompensated for the engine failure yawing moment by the undercompensation washout filter circuit 25. Under compensation allows the aircraft to return to near its original track angle. In this manner, on the ground, the aircraft is returned to approximately the original track angle, usually close to the runway centerline. Thus, on the ground, an aircraft embodying the invention will be able to comply with the FAA regulation requiring an airplane to remain within thirty feet of a runway centerline following an engine shutdown at speeds above $V_{MCG}$, the minimum control speed on the ground, which is typically 100–105 knots. In the air, the engine-out control augmentation rudder command maintains the aircraft's track angle prior to the engine failure. In either cases, the pilot and/or a track/heading angle hold function is allowed to input commands to correct any minor track errors that occur.

As noted above, an engine-out control augmentation subsystem formed in accordance with the invention will operate on an aircraft equipped with a conventional mechanical flight control system as well as on an aircraft equipped with an electronic flight control system. Engine-out control augmentation rudder commands produced by the invention can be used to drive the rudder pedals to command the rudder (in a parallel fashion) or to bypass the rudder pedals and command the rudder directly (in a series fashion).

While a preferred embodiment of the invention has been illustrated and described, it will be appreciated that various changes can be made therein. Consequently, within the scope of the appended claims, it is to be understood that the invention can be practiced otherwise than as specifically described herein.

The embodiments of the invention in which an exclusive property or privilege is claimed are defined as follows:

1. A full authority engine-out control augmentation subsystem for modifying the rudder command produced by a flight control system in a manner that: (i) compensates for the yawing moment created by the differential engine thrust that occurs when power from an engine located on one side of a multi-engine aircraft is lost or substantially reduced with respect to the power produced by the remaining engine(s); and (ii) returns the aircraft to its original track, said full authority engine-out control augmentation subsystem comprising:

(a) differential means for receiving thrust signals representing the thrust produced by engines located on the right and left sides of the multi-engine aircraft and producing a differential signal denoting the difference in thrust produced by said engines located on the right and left sides of said multi-engine aircraft;

(b) signal modifying means coupled to said differential means for receiving said differential signal and modifying said differential signal by gain enhancing and filtering said differential signal so as to produce an engine-out control augmentation rudder command signal that: (i) compensates for the yawing moment created by the differential thrust that occurs when power from an engine located on one side of said multi-engine aircraft is lost or substantially reduced with respect to the power produced by the remaining engines; and (ii) returns the aircraft to its original track; and, (c) signal combining means for receiving said engine-out control augmentation rudder command signal and combining said engine-out control augmentation rudder command signal with other rudder control signals to produce a rudder command signal suitable for controlling the position of the rudder of said multi-engine aircraft.

2. A full authority engine-out control augmentation subsystem as claimed in claim 1, wherein said differential signal is filtered by lag filtering said differential signal, said lag filtering occurring in series with said gain enhancing of said differential signal.

3. A full authority engine-out control augmentation subsystem as claimed in claim 2, wherein said differential signal is also filtered by overcompensation washout filtering said differential signal.

4. A full authority engine-out control augmentation subsystem as claimed in claim 3, wherein said overcompensation washout filtering of said differential signal occurs simultaneously with the gain enhancing of said differential signal.

5. A full authority engine-out control augmentation subsystem as claimed in claim 4, wherein said differential signal is also filtered by undercompensation washout filtering of said differential signal.

6. A full authority engine-out control augmentation subsystem as claimed in claim 5, wherein said undercompensation washout filtering of said differential signal occurs simultaneously with said gain enhancing on said overcompensation washout filtering of said differential signal.

7. A full authority engine-out control augmentation subsystem as claimed in claim 6, wherein said differential means includes a subtractive summer connected to receive said thrust signals representing the thrust produced by said engines on the right and left sides of said multi-engine aircraft.

8. A full authority engine-out control augmentation subsystem as claimed in claim 7, including a lag filter connected to the output of said subtractive summer, said lag filter creating said lag filtering of said differential signal.

9. A full authority engine-out control augmentation subsystem as claimed in claim 8, including a dead zone circuit located between the output of said subtractive summer and the input of said lag filter.

10. A full authority engine-out control augmentation subsystem as claimed in claim 8, including a divider, the numerator input of said divider connected to the output of said lag filter and the denominator input of said divider connected to receive a signal representing the $V_{CAS}^2$ value for said multi-engine aircraft.

11. A full authority engine-out control augmentation subsystem as claimed in claim 10, including:
(a) a gain circuit connected to the output of said divider;
(b) an overcompensation washout filter connected to the output of said divider;
(c) an undercompensation washout filter connected to the output of said divider; and,
(d) a three-input summer having two noninverting inputs and one inverting input, the output of said gain circuit connected to one of the noninverting inputs of said three-input summer, the output of said overcompensation washout filter connected to the other noninverting input of said three-input summer and the output of said undercompensation washout filter connected to the inverting input of said three-input summer; said gain circuit, said overcompensation washout filter, said undercompensation washout filter and said three-input summer co-acting to create said gain enhancing, said overcompensation washout filtering and said undercompensation washout filtering of said differential signal, the output of said three-input summer forming said engine-out control augmentation rudder command signal.

12. A full authority engine-out control augmentation subsystem as claimed in claim 11, including a limiter connected between the output of said three-input summer and said signal combining means.

13. A full authority engine-out control augmentation subsystem as claimed in claim 2, wherein said differential signal is also filtered by undercompensation washout filtering of said differential signal.

14. A full authority engine-out control augmentation subsystem as claimed in claim 13, wherein said undercompensation washout filtering of said differential signal occurs simultaneously with said gain enhancing of said differential signal.

15. A full authority engine-out control augmentation subsystem as claimed in claim 1, wherein said differential signal is filtered by overcompensation washout filtering said differential signal.

16. A full authority engine-out control augmentation subsystem as claimed in claim 15 wherein said overcompensation washout filtering of said differential signal occurs simultaneously with the gain enhancing of said differential signal.

17. A full authority engine-out control augmentation subsystem as claimed in claim 16, wherein said differential signal is also filtered by undercompression washout filtering of said differential signal.

18. A full authority engine-out control augmentation subsystem as claimed in claim 17, wherein said undercompensation washout filtering of said differential signal occurs simultaneously with said gain enhancing and said overcompensation washout filtering of said differential signal.

19. A full authority engine-out control augmentation subsystem as claimed in claim 1, wherein said differential signal is filtered by undercompensation washout filtering of said differential signal.

20. A full authority engine-out control augmentation subsystem as claimed in claim 19, wherein said undercompensation washout filtering of said differential signal occurs simultaneously with said gain enhancing of said differential signal.

* * * * *

UNITED STATES PATENT AND TRADEMARK OFFICE
CERTIFICATE OF CORRECTION

PATENT NO. : 4,935,682

DATED : June 19, 1990

INVENTOR(S) : Michael S. McCuen

It is certified that error appears in the above-identified patent and that said Letters Patent is hereby corrected as shown below:

| Title page, | Line | |
|---|---|---|
| [57] ABSTRACT | 12 | Delete "(25)" and insert therefor --25)-- |
| Column 1 | 51 | Delete "randome" and insert therefor --radome-- |
| Column 2 | 27 | After "-wire)," insert --flight control systems.-- |
| Column 2 | 66 | Delete "fuselag" and insert therefor --fuselage-- |
| Column 4 | 30 | Delete "effectivenes" and insert therefor --effectiveness-- |
| Column 6 | 16 | Delete "cases," and insert therefor --case,-- |
| Column 7 | 30 | Delete "on" and insert therefor --and-- |
| Column 8 | 44 | Delete "undercompression" and insert therefor --undercompensation-- |

Signed and Sealed this

Seventh Day of April, 1992

Attest:

HARRY F. MANBECK, JR.

Attesting Officer — Commissioner of Patents and Trademarks